ized Patent [19]

Hanink

[11] 4,123,294

[45] Oct. 31, 1978

[54] METHOD OF SEPARATING FERRITIC STEEL OR DUCTILE IRON FROM CERTAIN NONFERROUS METALS

[75] Inventor: Dean K. Hanink, Carmel, Ind.

[73] Assignee: General Motors Corporation, Detroit, Mich.

[21] Appl. No.: 763,301

[22] Filed: Jan. 28, 1977

[51] Int. Cl.² ............................................. C21D 1/44
[52] U.S. Cl. .................................... 148/13.1; 148/16;
 148/16.5; 148/144; 241/23; 241/24
[58] Field of Search ................. 148/16.5, 143, 144,
 148/13.1, 16; 241/14, 17, 23, 24, 29

[56] References Cited

U.S. PATENT DOCUMENTS

| 3,231,433 | 1/1966 | Van Mater et al. | 148/16.5 |
|---|---|---|---|
| 3,344,817 | 10/1967 | Connard | 148/16.5 |
| 3,351,684 | 11/1967 | Lincoln | 148/16.5 |
| 3,885,744 | 5/1975 | Drage | 241/29 |
| 4,006,042 | 2/1977 | Kieferle | 148/16.5 |

*Primary Examiner*—O. R. Vertiz
*Assistant Examiner*—Thomas W. Roy
*Attorney, Agent, or Firm*—George A. Grove

[57] ABSTRACT

A method is disclosed for treating scrap metal chips and turnings containing a valuable metal layer of silver, gold, or copper and a ductile layer of ferritic steel or ductile iron to recover the valuable metal. The chips and turnings are treated by carburization and quenching to embrittle the steel layers and then crushed converting the steel to a small mesh powder which can be screened from larger sized agglomerates of valuable metal insensitive to the embrittling process.

3 Claims, No Drawings

METHOD OF SEPARATING FERRITIC STEEL OR DUCTILE IRON FROM CERTAIN NONFERROUS METALS

This invention relates to the mechanical separation of silver, gold, or copper from ductile iron or ferritic steel. More specifically, this invention relates to a method of treating scrap metal chips and turnings containing layers of such a valuable metal and layers of soft steel to separate the layers and recover the valuable metal.

There are articles of commerce that are formed of a metal layer such as silver, gold, or copper laminated to an iron or steel layer. An example of such a product is a steel backed silver sleeve bearing such as may be employed as the crank shaft journal bearing for a large diesel engine. A bearing of this type is depicted in U.S. Pat. No. 2,752,210. In their manufacture, layered bearings such as these are often machined to dimension producing chips and turnings containing both silver and iron. These particles are characterized by a silver layer and a steel layer, but the portions of silver and steel vary widely from chip to chip. It is desirable to have a method of accomplishing at least a gross separation of the silver from the steel.

It is an object of this invention to provide a method for treating metal particles each having a soft iron or steel layer bonded to a layer of a valuable metal such as silver, gold, copper or their alloys to recover the valuable metal. In the method, the iron portions are carburized and hardened and the particles are then pulverized in a manner so the iron breaks away from the ductile valuable metal and is reduced to a small mesh powder easily separated from the unhardened valuable metal by a method such as screening.

In accordance with a preferred embodiment of my invention, these and other objects and advantages are obtained in connection with the treatment of machine turnings produced in the manufacture of the above described steel backed silver bearings by the following practice. The steel used in such bearings typically has a low carbon content and cannot be hardened by the formation of martensite. The silver layer is substantially pure silver. Both metals in the turnings are ductile so they cannot be easily separated by mechanical means. The particles are heated in a furnace in a suitable carburizing atmosphere at a suitable temperature above the austenitic temperature of the steel until sufficient carbon has diffused into the steel so that it can become through hardened. The chips are then rapidly cooled to convert the microstructure of the steel portion to hard, brittle martensite. The silver is insensitive to the embrittling process so the chips now contain a hard steel layer and a soft silver layer. They are then ground, shredded or otherwise suitably comminuted until the iron layer breaks away from the silver and is reduced to a small mesh powder. The soft silver agglomerates in larger masses so the iron and silver can be separated by suitable means. Depending on the requirements of the user, the separation may be viewed as completed or since the separated metals are much more uniform in composition than the scrap starting material they may be reliably sampled and assayed to determine if further treatment of either metal is required.

Obviously, my method is applicable to chips containing a ductile iron or low carbon steel fraction and a soft valuable metal fraction, that is, gold, silver, copper or alloys thereof. As used herein, the terms gold alloys, silver alloys and copper alloys mean those valuable metal alloys which are not susceptible to hardening by carburization and quenching.

These and other objects and advantages of my invention will become more apparent from a more detailed description of my invention which follows.

Certain diesel engine journal bearings of semicircular configuration were formed of an AISI 1020 plain carbon steel sleeve approximately 0.250 inch thick and a lining of essentially pure silver approximately 0.1 to 0.2 inch thick bonded to the inside radius of the steel sleeve. The ends of the bearings were machined to finish them and long ductile turnings approximately 0.05 inch thick were produced in the process.

Approximately 3 pounds of these turnings were placed in a sheet metal basket which was in turn put on a stainless steel tray. The tray was placed in a propane fired carburizing furnace with a carbon monoxide-hydrogen-nitrogen-$CH_4$ atmosphere produced by the catalytic oxidation of methane in natural gas. The furnace temperature was held at approximately 1600° F. and the turnings were through carburized to a carbon concentration of about 1% in about 1½ hours. The turnings were removed from the furnace and rapidly quenched below the austenitic temperature of the carburized 1020 steel by immersing the basket containing the turnings in water, thereby transforming the steel portions of the turnings to martensite.

It was readily observed that the iron portions of the turnings were very brittle after the carburizing and quenching operations, whereas the silver portions of the turnings remained ductile.

The treated turnings were comminuted in a heavy walled stainless steel cylinder having a 2 inch bore which served as a mortar. The turnings were crushed by hand with a blunt ended solid pestle. The material was removed from the mortar and examined. The iron was observed to be in the form of dark particles ranging in size from about 1/16 in. across to fine powder. The silver had agglomerated into shiny particles approximately ⅛ of an inch in diameter and larger.

As shown in the example, comminuting the carburized composites reduces the iron portions of the composites to finer particles than the nonferrous portions. After comminution, the iron can be easily separated from the valuable metal such as silver, gold, or copper by any suitable mechanical means such as sieving.

The types of iron which are separable from silver, gold, or copper by the practice of this invention are such that they are not hardenable by conversion to martensite unless they are first carburized. Irons and ferritic steels with a carbon content of less than about 0.8% by weight are appropriate. This includes most low carbon steels. Moreover, the ferrous portions of the composites may be carburized by any appropriate method. Pack and liquid carburization methods are suitable, however, gas carburization is the preferred method of practicing my invention.

In order to form martensite, the steel containing particles which are treated must first be carburized at temperatures above the austenitic transformation temperature of the iron composition and then rapidly quenched. A water quench was used in the example, but any suitable quench means that leads to the formation of martensite may be employed. It will be appreciated by persons skilled in the art that particles with larger cross sections will take longer times to be through carburized.

After the iron has been transformed into a brittle state by carburizing and quenching, the ferrous and nonferrous portions can be easily separated by any appropriate comminuting means. The composite particles may be tumbled in a barrel, passed through a hammermill, violently agitated, shredded, or ground, for example. The shock of the comminution breaks the iron away from valuable metal and reduces the iron into a fine powder, whereas the valuable metal typically aggregates in substantially larger particles.

We have depicted the invention in terms of metal turnings and chips, however, the size of the iron-valuable metal laminated composite particles is not particularly critical so long as the iron layer can be through carburized in a reasonable time.

While my invention has been disclosed in terms of specific embodiments thereof, it will be appreciated that other forms could readily be adapted by one skilled in the art. Accordingly, the scope of my invention is to be considered limited only by the following claims.

What is claimed is:

1. A method of treating a composite comprising a layered portion of a nonferrous metal taken from the group consisting of silver, silver alloys, gold, gold alloys, copper and copper alloys bonded to a layered portion of iron or low carbon steel wherein the ferrous layer can be through carburized to substantially separate the nonferrous metal from the ferrous metal comprising;

heating the composite material in a carburizing environment at a temperature above the austenitic transformation temperature of said ferrous metal portion until sufficient carbon has diffused into the ferrous metal portion to render it through hardenable, quenching the composite from a temperature above the austenitic temperature of the carburized ferrous metal portion to a temperature below the transformation temperature of the ferrous metal portion to convert said portion to martensite, subjecting said composite to a comminuting operation which substantially breaks the hardened ferrous metal portion away from the nonferrous portion reducing the hardened ferrous portion to particles that are smaller in size than comminution products of unhardened nonferrous portion, and separating the ferrous metal particles from the nonferrous metal comminution products.

2. A method of treating composite particles comprising scrap chips or turnings that contain a layer of a nonferrous metal taken from the group consisting of silver, silver alloys, gold, gold alloys, copper and copper alloys bonded to a layer of iron or low carbon steel to substantially separate the nonferrous metal from the ferrous metal comprising;

heating the particles in a carburizing environment at a temperature above the austenitic transformation temperature of said ferrous metal layers until sufficient carbon has diffused therein to render them through hardenable, quenching the particles from a temperature above the austenitic temperature of the carburized ferrous metal layers to a temperature below the transformation temperature of the ferrous metal layers to convert them to martensite, subjecting said particles to a comminuting operation which substantially breaks the martensitic ferrous metal layers away from the nonferrous layers and reducing the hardened ferrous layers to fine particles and agglomerating the ductile nonferrous layer into particles substantially larger than the ferrous metal particles, and separating the ferrous metal particles from the nonferrous metal particles.

3. A method of treating particles that contain a silver portion bonded to a steel portion such as are produced as offal in the manufacture of steel backed silver bearings to substantially separate the silver from the steel comprising;

heating the particles in a gas carburizing environment at a temperature above the austenitic transformation temperature of the steel portions until sufficient carbon has diffused into the steel portions of said particles to render the steel portions through hardenable, quenching the particles from a temperature above the austenitic temperature of the carburized ferrous metal portions to a temperature below the transformation temperature of the steel portions to convert said steel portions to martensite, subjecting said particles to a comminuting operation which substantially breaks the martensitic steel portions away from the nonferrous portions reducing the steel portions to fine particles and agglomerating the ductile nonferrous portions into particles substantially larger than the steel particles, and separating the steel particles from the silver particles.

* * * * *